United States Patent Office.

JOSEPH W. HASKINS, OF CHARLESTOWN, MASSACHUSETTS.

*Letters Patent No. 61,936, dated February 12, 1867.*

IMPROVED EDIBLE PREPARATION FROM INDIAN CORN.

*The Schedule referred to in these Letters Patent and making part of the same.*

TO ALL PERSONS TO WHOM THESE PRESENTS SHALL COME:

Be it known that I, JOSEPH W. HASKINS, of Charlestown, in the county of Middlesex, and State of Massachusetts, have made a new and useful Edible Composition, and do hereby declare the same to be fully described as follows:

In carrying out my invention, I take the kernels of common maize, and parch or "pop" them in any well-known manner, that is to say, I expose them to heat in a pan or parching vessel, and, after they have become split open by the heat, I reduce them by pounding them in a mortar and with a pestle or other suitable means. After their reduction, I mix with them, by stirring them in it, a quantity of a solution of gum acacia, or a mucilaginous or gelatinous equivalent which may be eaten with impunity. To this mixture may be added a quantity of saccharine matter, such as sugar or any substance to impart a flavor or agreeable taste to the composition. The proportions of the ingredients should be such, that when together they shall form a yielding or doughy compound capable of being compacted in a mould. I usually press the compound into the form of small rectangular, square, or other proper-shaped cakes, which after exposure to the atmosphere, or to the heat of an oven, will become indurated and ready for sale or use. I am aware that maize, after having been "popped," has been ground or broken up and mixed with molasses and made into balls for sale and to be eaten. Therefore, I do not claim such. When so made it is apt to be sticky, and in warm weather the molasses is liable to separate from the maize, but my improved composition, besides being unobjectionable in such respects, is more nutritive and better in appearance and otherwise.

What, therefore, I claim as my invention, is the improved edible composition, as made of maize and gum acacia, or the same and one or more sweetening or flavoring matters or substances, substantially as set forth.

JOSEPH W. HASKINS.

Witnesses:
R. H. EDDY,
F. P. HALE, Jr.